US012710865B2

(12) United States Patent
Chang et al.

(10) Patent No.: US 12,710,865 B2
(45) Date of Patent: Aug. 18, 2026

(54) ADAPTIVE TOUCH INTERACTIONS FOR WEARABLE DEVICES

(71) Applicant: GN Hearing A/S, Ballerup (DK)

(72) Inventors: Bill Chia-Wu Chang, Naperville, IL (US); Gregory Brian Olsen, Lombard, IL (US); Qi Yang, Chicago, IL (US)

(73) Assignee: GN HEARING A/S, Ballerup (DK)

( * ) Notice: Subject to any disclaimer, the term of this patent is extended or adjusted under 35 U.S.C. 154(b) by 0 days.

(21) Appl. No.: 18/945,491

(22) Filed: Nov. 12, 2024

(65) Prior Publication Data

US 2026/0133690 A1 May 14, 2026

(51) Int. Cl.
*G06F 3/04883* (2022.01)

(52) U.S. Cl.
CPC ................................ *G06F 3/04883* (2013.01)

(58) Field of Classification Search
CPC .................................................. G06F 3/04883
See application file for complete search history.

(56) References Cited

U.S. PATENT DOCUMENTS 7,694,231 B2 4/2010 Kocienda et al.
10,503,317 B2 12/2019 Domaradzki et al.
2011/0050563 A1 3/2011 Skutt
2013/0234929 A1* 9/2013 Libin ........................ G06F 3/01 345/156
2014/0125619 A1* 5/2014 Panther ................ A61B 5/6838 345/173
2015/0220152 A1* 8/2015 Tait ......................... G06F 3/017 345/156
2017/0160922 A1 6/2017 Chiarini

FOREIGN PATENT DOCUMENTS

CA 2731921 4/2010

OTHER PUBLICATIONS

Buschek, D., et al., "Dynamic UI adaptations for One-Handed Use of large mobile touchscreen," LMU Munich, Munich, Germany, Conference Paper in Lecture Notes in Computer Science, dated Sep. 2017.

* cited by examiner

*Primary Examiner* — Yaron Cohen
(74) *Attorney, Agent, or Firm* — Vista IP Law Group, LLP

(57) ABSTRACT

A wearable device includes: a first output transducer configured to provide an audio output for perception by a user; a touch-based interface configured to receive an user input from the user, and to generate an interface output based on the input, wherein the touch-based interface is not directly viewable by the user when the wearable device is worn by the user; a sensor configured to sense a condition related to the user input, and to generate a sensor output; and a processing unit configured to process the interface output based on a first processing scheme if the sensor output indicates a first context of the user input or if the processing unit does not obtain the sensor output, and wherein the processing unit is configured to process the interface output based on a second processing scheme if the sensor output indicates a second context of the user input.

26 Claims, 7 Drawing Sheets

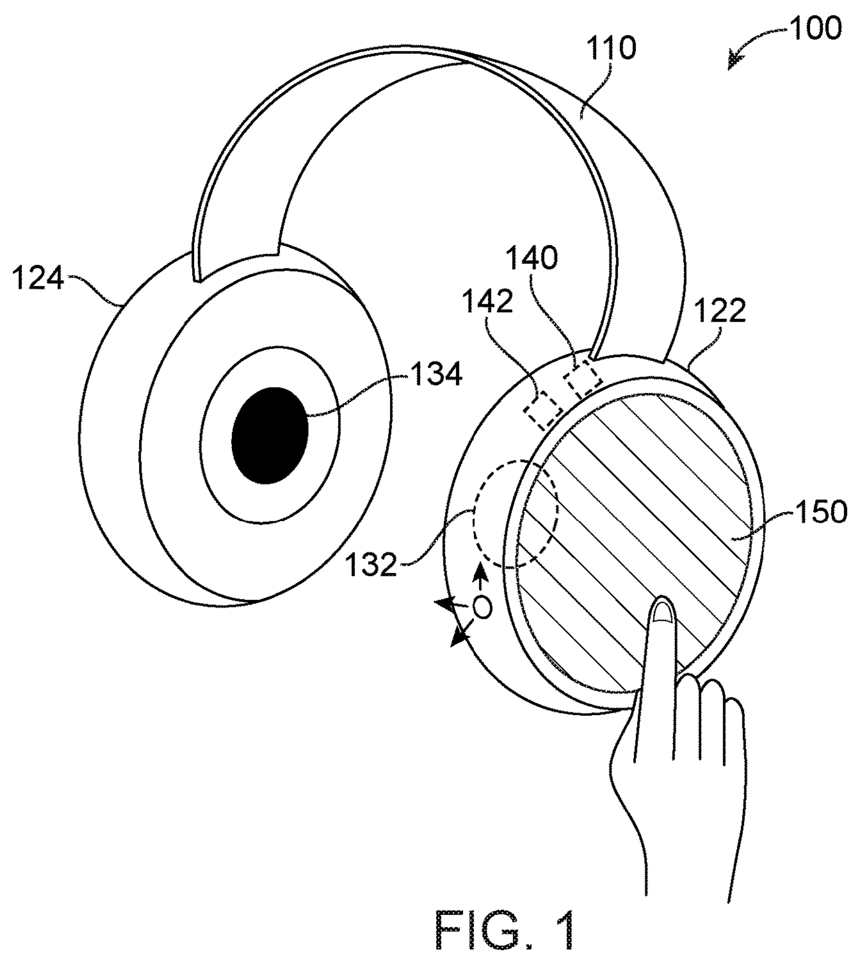
FIG. 1
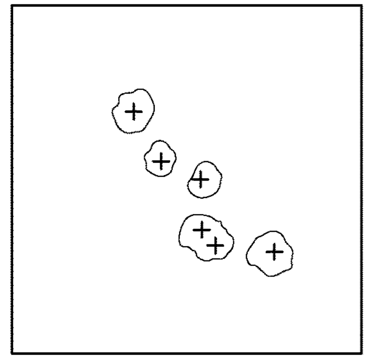
Raw sensor input
FIG. 2A
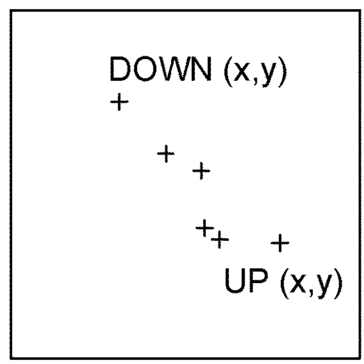
a) Touch event stream
FIG. 2B
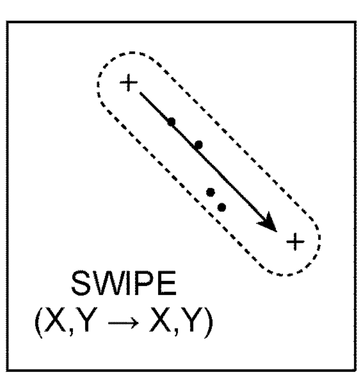
b) Recognized gesture
FIG. 2C First context
Second context
300
OK
OK
300
150
150

First context
2nd context
150
150
Contact at t = 0
Lift at t = 0.3 sec
Input threshold
period = 0.4 sec
Contact at t = 0
Lift at t = 0.5 sec
Input threshold
period = 0.6 sec First context
Second context
150
150
Contact
d
Lift
Contact
d
Lift
d = 2mm
Input distance
threshold = 4mm
d = 5mm
Input distance
threshold = 6mm

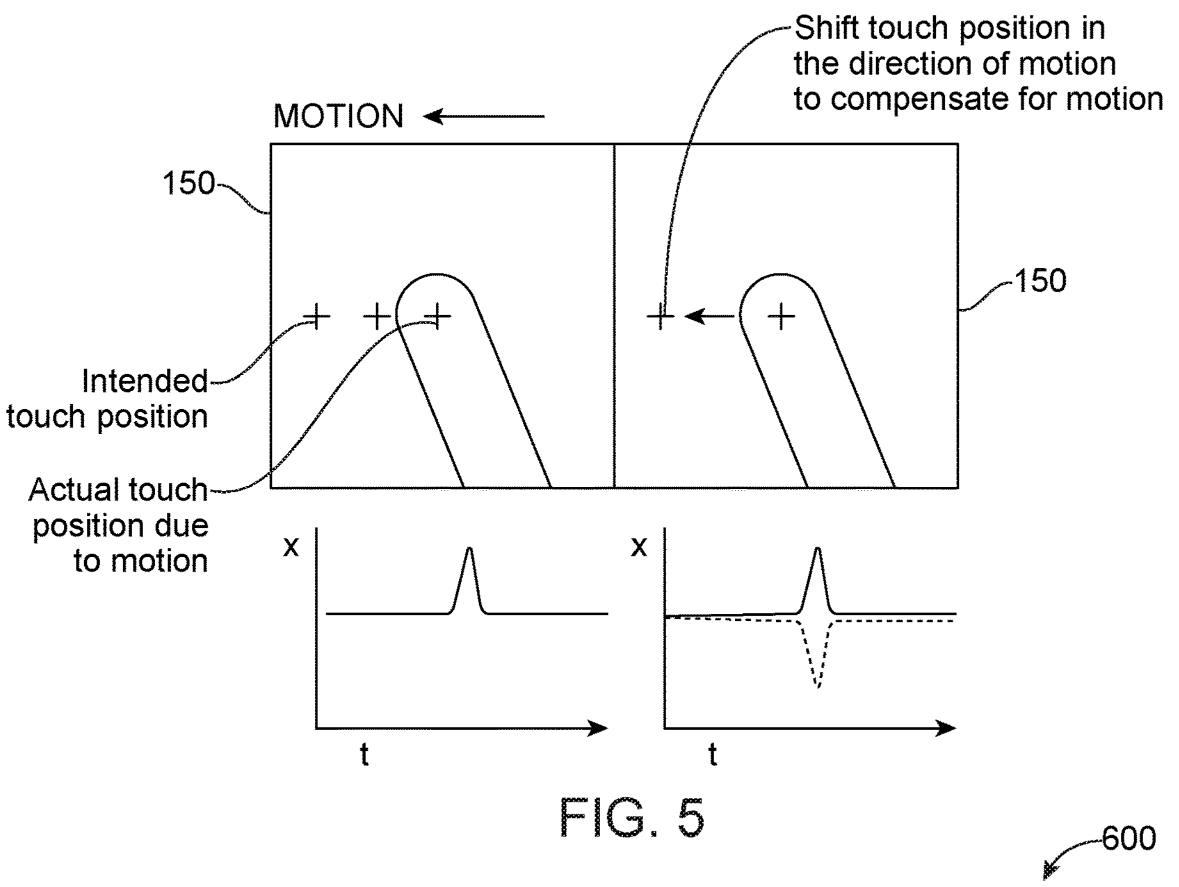

| Indicator | Example | Sensors |
|---|---|---|
| (A) Device in Motion | User in motion, using smart watch while walking or running. Using tablet on a moving vehicle. | Motion sensors (accelerometer, gyro) |
| (B) Device relative orientation | Wearable device is shifted, out of place, etc. | Orientation sensor(s) |
| (C) Environmental lighting condition | Using a device in the dark with limited lighting | Light sensor, clock |
| (D) increased input errors | User suddenly make more touch input errors than before | Input error sensor |
| (E) Indirect Cognitive measure | User in situation where cognitive load is high or stress is high, so much that motor skills might be affected | Mic, bio-sensor, etc. |

Reconfigure interface parameters

When the input precision changes, a touch-driven interface can be reconfigured in the following ways:

| | Parameters | Definition | Example of reconfiguration |
|---|---|---|---|
| 702 | Widget Size, Position, Padding | Logical size[2], position of interface widgets such as a button, defined in software. | Enlarge activation area of buttons when input precision is low. |
| 704 | Timing Thresholds | Timers used to determine whether a user input is activated or not. (E.g. difference between a Tap and a Tap-and-hold gesture) | Increase time thresholds when input precision is low. |
| 706 | Gesture Thresholds | Gesture distance thresholds are used to differentiate between different gesture recognized by the interface[3]. (Tap vs. Drag) | Relax distance thresholds to allow less precise gestures to be performed.<br>User may find a button difficult to tap while they are in motion (running), due to increased noise in their input precision. This may be due to undesired motion exceeds the drift allowed by the algorithm to recognize a tap gesture. Thus the software recognize gesture as a drag or swipe by mistake when user intended to tap.<br>When we detect lower input precision due to motion, the drift threshold can be increased to allow Tap gesture to be easily performed and not mistaken as a Drag or Swipe gesture. |
| 708 | Touch input position | The raw touch point detected by the touch surface | When sudden motions are detected with accelerometer and gyro sensor on device, artificially shift touch position as detected in the opposite direction to compensate possible input error. |

ADAPTIVE TOUCH INTERACTIONS FOR WEARABLE DEVICES

FIELD

The present disclosure relates to wearable devices, such as hearing devices. More specifically, the disclosure relates to a hearing device having a touch-based interface.

BACKGROUND

Touch-based interfaces are widely used on portable and wearable devices, such as smartphones and smartwatches. In contrast to physical interfaces, such as buttons, touch interfaces require users to utilize higher visual acuity, precise motor skill, and muscle memory to perform gestures, such as tap, hold, swipe, etc.

Input precision of touch interaction can be impacted by a number of factors. This can be temporary or contextual where a user or device is in motion (e.g., use of phone while walking or onboard a moving vehicle), or can be more long-term such as due to a health condition, which is highly relevant for geriatric users. The precision issue is further exacerbated when the touch-based interface surfaces are smaller, making it more prominent on devices such as wearable devices (e.g., smartwatches, earphones, hearing devices, etc.). For example, a typical smart watch may have a touch interaction surface only slightly bigger than an average fingertip. In some cases, hearing devices, such as earphones, headsets, hearing aids, etc., may have even smaller surfaces than an average user's fingertip. Operating these smaller surfaces may be difficult, imprecise, and error prone.

Thus, new techniques of implementing touch-based interfaces are described herein.

SUMMARY

A wearable device includes: a first output transducer configured to provide an audio output for perception by a user; a touch-based interface configured to receive an user input from the user, and to generate an interface output based on the input, wherein the touch-based interface is not directly viewable by the user when the wearable device is worn by the user; a sensor configured to sense a condition related to the user input, and to generate a sensor output; and a processing unit configured to process the interface output based on a first processing scheme if the sensor output indicates a first context of the user input or if the processing unit does not obtain the sensor output, and wherein the processing unit is configured to process the interface output based on a second processing scheme if the sensor output indicates a second context of the user input.

Optionally, the sensor output indicates the first context when the wearable device is stationary or has a motion that is below a motion threshold.

Optionally, the sensor output indicates the second context when the wearable device is in motion or has a motion that is above a motion threshold.

Optionally, the sensor output indicates the first context when a user input error rate is below an error threshold.

Optionally, the sensor output indicates the second context when a user input error rate is above an error threshold.

Optionally, the sensor output indicates the first context when the user is under a cognitive load that is below a cognitive load threshold.

Optionally, the sensor output indicates the second context when the user is under a cognitive load that is higher than a cognitive load threshold.

Optionally, the touch-based interface includes a virtual button, wherein the virtual button has a first size in the first processing scheme, and has a second size in the second processing scheme, the second size being larger than the first size.

Optionally, the first and second processing schemes involve an input-receiving time threshold, wherein the input-receiving time threshold has a first duration in the first processing scheme, and has a second duration in the second processing scheme, the second duration being longer than the first duration to allow the user more time to make an input gesture.

Optionally, the first and second processing schemes involve an input-receiving distance threshold, wherein the input-receiving distance threshold has a first distance in the first processing scheme, and has a second distance in the second processing scheme, the second distance being shorter than the first distance.

Optionally, the input-receiving distance threshold is for allowing the processing unit to identify a tap input.

Optionally, the input-receiving distance threshold is for allowing the processing unit to identify a swipe input.

Optionally, the sensor is configured to sense motion, and wherein the processing unit is configured to shift a touch position at the touch-based interface in a direction of the sensed motion to compensate for input error due to the sensed motion.

Optionally, the sensor comprises a motion sensor; wherein the processing unit is configured to utilize the first processing scheme if the sensor output indicates that the wearable device is stationary or has a motion that is below a motion threshold; and wherein the processing unit is configured to utilize the second processing scheme if the sensor output indicates that the wearable device is in motion or has a motion that is higher than the motion threshold or another motion threshold.

Optionally, the sensor comprises in input-error detector; wherein the processing unit is configured to utilize the first processing scheme if the sensor output indicates a number of input-errors that is below an error threshold; and wherein the processing unit is configured to utilize the second processing scheme if the sensor output indicates that the number of input-errors is higher than the error threshold or another error threshold.

Optionally, the sensor comprises a microphone configured to detect sound from an environment; wherein the processing unit is configured to utilize the first processing scheme if the sensor output indicates that the user is in a quiet environment or that the sound from the environment is below a sound threshold; and wherein the processing unit is configured to utilize the second processing scheme if the sensor output indicates that the user is in a noisy environment or that the sound from the environment is above the sound threshold or another sound threshold.

Optionally, the sensor comprises a biosensor configured to sense one or more bio-parameters of the user.

Optionally, the processing unit is configured to utilize the first processing scheme if the sensor output indicates that the user is not stressed or not tired; and wherein the processing unit is configured to utilize the second processing scheme if the sensor output indicates that the user is stressed or tired.

Optionally, the processing unit is configured to utilize the first processing scheme if the sensor output indicates that the user is not sick; and wherein the processing unit is configured to utilize the second processing scheme if the sensor output indicates that the user is sick.

Optionally, the wearable device is a hearing aid.

Optionally, the hearing aid comprises a behind-the-ear unit, and the touch-based interface is at the behind-the-ear unit.

Optionally, the wearable device is a headset.

Optionally, the touch-based interface is at a headband of the headset.

Optionally, the touch-based interface is at an earphone of the headset.

Optionally, the wearable device is a helmet, and wherein the touch-based interface is at the helmet.

Optionally, the wearable device is an eyewear, and wherein the touch-based interface is at a side of the eyewear.

A method performed by a wearable device, includes: receiving, by a touch-based interface of the wearable device, an user input from the user, wherein the touch-based interface is not directly viewable by the user of the wearable device when the wearable device is worn by the user; generating an interface output by the touch-based interface based on the input from the user; sensing, by a sensor of the wearable device, a condition related to the user input; generating a sensor output by the sensor of the wearable device; and processing, by a processing unit of the wearable device, the interface output from the touch-based interface (1) based on a first processing scheme if the sensor output indicates a first context of the user input or if the processing unit does not obtain the sensor output, or (2) based on a second processing scheme that is different from the first processing scheme if the sensor output indicates a second context of the user input.

Other features and advantageous will be described in the detailed description.

BRIEF DESCRIPTION OF THE DRAWINGS

The above and other features and advantages will become readily apparent to those skilled in the art by the following detailed description of exemplary embodiments thereof with reference to the attached drawings, in which:

FIG. 1 illustrates a wearable device in a form of a hearing device.

FIGS. 2A-2C illustrate a technique for interpreting sensed input received at a touch-based interface.

FIG. 5 illustrates another example of providing different processing schemes to process user input received at a touch-based interface.

FIG. 6 illustrates examples of sensors for sensing different conditions related to different context of user input received at a touch-based interface.

FIG. 7 illustrates examples of reconfiguration of input interface parameters based on different contexts of user input received at a touch-based interface.

DETAILED DESCRIPTION

Figures 3, 4A, 4B:
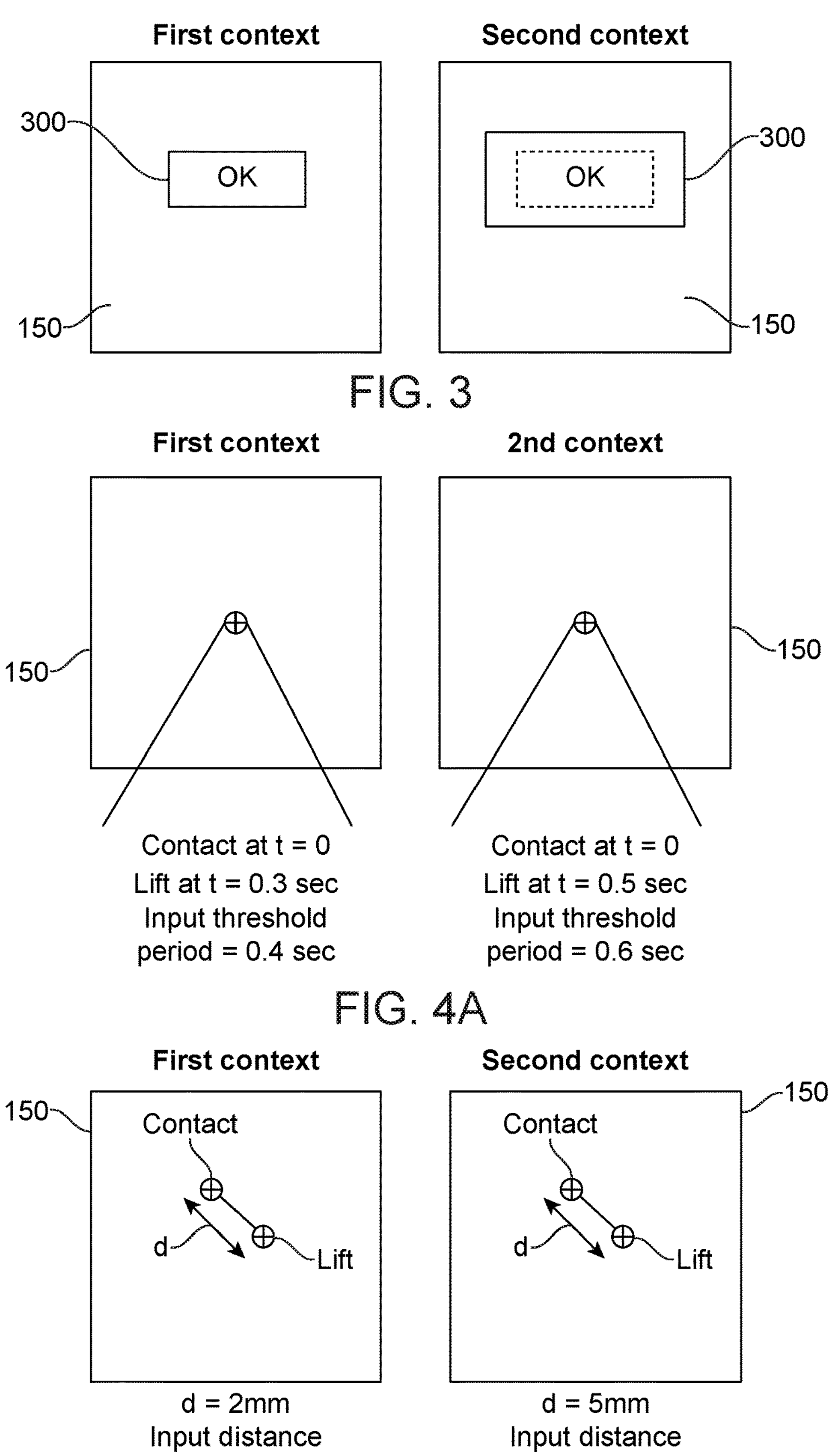
FIG. 3 illustrates an example of providing different processing schemes to process user input received at a touch-based interface.
FIGS. 4A and 4B illustrate other examples of providing different processing schemes to process user input received at a touch-based interface.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 illustrates a wearable device 100. The wearable device 100 is a hearing device, and has a form factor of a headset in the illustrated example. The wearable device 100 includes a headband 110, a first headphone 122, and a second headphone 124. The first headphone 122 has a first output transducer 132 configured to output sound for perception by a user of the wearable device 100. The second headphone 124 has a second output transducer 134 configured to output sound for perception by the user of the wearable device 100. In the illustrated example, the wearable device 100 also includes a touch-based interface 150 configured to receive an user input (e.g., tap, double-tap, swipe, etc.) from the user of the wearable device 100. The wearable device 100 also includes a sensor 140 configured to sense a condition related to the user input, and to generate a sensor output. The wearable device 100 further includes a processing unit 142 configured to process the interface output based on a first processing scheme if the sensor output indicates a first context of the user input or if the processing unit 142 does not obtain the sensor output. The processing unit 142 is also configured to process the interface output based on a second processing scheme if the sensor output indicates a second context of the user input.

When the wearable device 100 is worn by the user and/or the touch-based interface 150 is used by the user, the touch-based interface 150 is located out of sight from the user. Thus, the touch-based interface 150 is not directly viewable by the user of the wearable device 100 when the wearable device 100 is worn by the user and/or when the wearable device 100, such as the touch-based interface 150, is used by the user.

The processing unit 142 is configured to interpret the user input detected by the touch-based interface 150. FIGS. 2A-2C illustrate an exemplary technique that may be utilized by the processing unit 142 to interpret sensed user input received at the touch-based interface 150. FIG. 2A shows positions of touched areas at the touch-based interface 150 over a duration of time. The timing of each of the touched positions is tracked by the processing unit 142. In the illustrated example, the top left most touched position is the first touched position by the user during the duration of time, and the bottom right most touched position is the last touched position by the user during the duration of time. Alternatively or additionally, the processing unit 142 may determine that the top left most touched position is provisioned by the user applying a downward pressure towards the touch-based interface 150 (e.g., first contact point of the input gesture), and the bottom right most touched position is provisioned by the user lifting his/her finger from the touch-based interface 150 (e.g., last contact point of the input gesture) (FIG. 2B). Based on the timing information, the tracked positions of the touched areas, the identified first contact point, the identified last contact point, or a combination of any of the foregoing, the processing unit 142 may interpret the user input occurring with the duration of time is a swipe action in the direction shown in FIG. 2C.

The processing unit 142 may also be configured to interpret other types of user input detected by the touch-based interface 150. By means of non-limiting examples, the processing unit 142 may utilized different interpretation schemes to determine whether a user input received at the touch-based interface 150 is a tap input, a double-tap input, a swipe input, a zoom-in input, a zoom-out input, a double-swipe input, etc.

The touch-based interface 150 may have a rectilinear planar configuration, or a curvilinear planar configuration. In the illustrated example, the touch-based interface 150 is located at one of the headphones 122, 124. In other cases, the touch-based interface 150 may be located at the headband 110. In further cases, there may be a first touch-based interface 150 at the first headphone 122, and a second touch-based interface 150 at the second headphone 124.

In some cases, the headset shown in FIG. 1 may be a media headset. Alternatively, the headset may be a hearing-protection device configured for wear by the user in a mission (e.g., rescue mission, combat mission, etc.). In further cases, the headset may optionally further include a first microphone configured to detect sound from the environment. In such cases, the processing unit 142 may be configured to process microphone output from the first microphone and to generate a processed output. The first output transducer 132 and/or the second output transducer 134 is configured to output sound based on the processed output from the processing unit 142. In other cases, the headset may optionally include a second microphone configured to detect sound from the environment. In such cases, the processing unit 142 may be configured to process microphone output from the first microphone and microphone output from the second microphone, and to generate a processed output. The first output transducer 132 and/or the second output transducer 134 is configured to output sound based on the processed output from the processing unit 142. In further cases, the headset may optionally further include another microphone configured to detect speech from the user. Such microphone may be attached to one of the headphones 122, 124 via an elongate member, or a cable, etc.

The sensor 140 is configured to sense a condition related to the user input. The sensor output from the sensor 140 may indicate a context (e.g., situation, circumstance, condition, etc.) in/under which the user input is received by the touch-based interface 150. By means of non-limiting examples, the sensor 140 may be a motion sensor configured to detect motion, an input-error detector configured to detect input-error associated with the user input, one or more microphones configured to detect sound from the environment, one or more bio-sensors configured to detect one or more physiological parameters of the user of the wearable device 100, or two or more of any combination of the foregoing.

In the case in which the sensor 140 includes a motion sensor, the sensor output may indicate a first context when the wearable device is stationary or has a motion that is below a first motion threshold, and/or may indicate a second context when the wearable device is in motion or has a motion that is above the first motion threshold or a second motion threshold (another motion threshold). The second motion threshold may be higher than the first motion threshold.

In the case in which the sensor 140 includes an input-error detector, the sensor output may indicate a first context when a user input error rate is below a first error threshold, and may indicate a second context when a user input error rate is above the first error threshold or a second error threshold (another error threshold). The second error threshold may be higher than the first error threshold.

In the case in which the sensor 140 includes a microphone, the sensor output may indicate a first context when the user is in a quiet environment or in an environment having a sound level below a first sound threshold, and may indicate a second context when the user is in a noisy environment or in an environment having a sound level above the first sound threshold or a second sound threshold (another sound threshold). The second sound threshold may be higher than the first sound threshold. In some cases, the user of the wearable device 100 may be assumed to be under a cognitive load that is below a first cognitive load threshold when the user is in a quiet environment or an environment having a sound level below the first sound level. The user may also be assumed to be under a cognitive load that is higher than the first cognitive load threshold or a second cognitive load threshold (another cognitive load threshold) when the user is in a noisy environment or an environment having a sound level above the first sound level or the second sound level. The second cognitive load threshold may be higher than the first cognitive load threshold.

In the case in which the sensor 140 includes a bio-sensor, the sensor output may indicate a first context when the user is not stressed, not tired, and/or not sick, and may indicate a second context when the user is stressed, tired, and/or sick. The bio-sensor may be configured to sense a temperature, a heart rate, an oxygen level, a perspiration level, skin conductance etc., of the user of the wearable device 100. In some cases, the user of the wearable device 100 may be assumed to be under a cognitive load that is below a first cognitive load threshold when the user is not stressed, not tired, and/or not sick. The user may also be assumed to be under a cognitive load that is higher than the first cognitive load threshold or a second cognitive load threshold (another cognitive load threshold) when the user is stressed, tired and/or sick.

As mentioned, the processing unit 142 is configured to process the interface output based on a first processing scheme if the sensor output indicates a first context of the user input or if the processing unit 142 does not obtain the sensor output, and is also configured to process the interface output based on a second processing scheme if the sensor output indicates a second context of the user input. FIG. 3 illustrates an example of processing schemes utilize by the processing unit 142 to process user input received at the touch-based interface 150. As shown in the figure, the touch-based interface 150 includes a virtual button 300. In a first processing scheme, the virtual button 300 may have a first size. In a second processing scheme, the virtual button 300 may have a second size that is larger than the first size.

In one example, the processing unit 142 is configured to utilize the first processing scheme with the smaller size virtual button 300 when the user input is received by the touch-based interface 150 under a first context (e.g., condition, circumstance, situation, etc., in which the user input is received), such as when the wearable device 100 is stationary or has a motion below a first motion threshold. The processing unit 142 may also be configured to utilize the second processing scheme with the larger size virtual button 300 when the user input is received by the touch-based interface 150 under a second context, such as when the wearable device is in motion or if the motion is above the first motion threshold or a second motion threshold (another motion threshold). The second motion threshold may be higher than the first motion threshold. The motion may be indicated by motion data output by the motion sensor. Thus, the processing unit 142 may be configured to selectively utilize the first processing scheme or the second processing scheme based on output from the motion sensor (an example of the sensor 140).

As another example, the processing unit 142 may be configured to utilize the first processing scheme with the smaller size virtual button 300 when the user input is received by the touch-based interface 150 under a first context when a user input error rate associated with the user input is below a first error threshold. The processing unit 142 may also be configured to utilize the second processing scheme with the larger size virtual button 300 when the user input is received by the touch-based interface 150 under a second context when the user input error rate associated with the user input is above the first error threshold or a second error threshold. The user input error rate may be indicated by data output by an input error detector. Thus, the processing unit 142 may be configured to selectively utilize the first processing scheme or the second processing scheme based on output from the input error detector (an example of the sensor 140).

As another example, the processing unit 142 may be configured to utilize the first processing scheme with the smaller size virtual button 300 when the user input is received by the touch-based interface 150 under a first context when the user is in a quite environment or in an environment having a sound level below a first sound threshold. The processing unit 142 may also be configured to utilize the second processing scheme with the larger size virtual button 300 when the user input is received by the touch-based interface 150 under a second context when the user is in a noisy environment or in an environment having a sound level above the first sound threshold or the second sound threshold. The level of sound (volume) may be indicated by an output (e.g., microphone output) of a microphone. Thus, the processing unit 142 may be configured to selectively utilize the first processing scheme or the second processing scheme based on output from the microphone (an example of the sensor 140).

As a further example, the processing unit 142 may be configured to utilize the first processing scheme with the smaller size virtual button 300 when the user input is received by the touch-based interface 150 under a first context when the user is not stressed, not tired, and/or not sick. The processing unit 142 may also be configured to utilize the second processing scheme with the larger size virtual button 300 when the user input is received by the touch-based interface 150 under a second context when the user is not stressed, tired, and/or sick. The condition of the user may be indicated by output of one or more bio-sensors. Thus, the processing unit 142 may be configured to selectively utilize the first processing scheme or the second processing scheme based on output from the bio-sensor(s) (an example of the sensor 140).

FIG. 4A illustrates another example of providing different processing schemes to process user input received at the touch-based interface 150. The processing scheme for processing user input received at touch-based interface 150 may include an input-receiving time threshold. The input-receiving time threshold is utilized by the processing unit 142 to determine whether a user input satisfies a temporal requirement for a certain gesture input. As shown in FIG. 4A, a normal tap input may involve a user pressing at one location on the touch-based interface 150, followed by a lifting of the finger within a short period (e.g., within an input-receiving time threshold of 0.4 second)—like that shown in the left diagram of FIG. 4A. However, a user may sometimes have difficulty completing such gesture due to the user being in motion, being under stress, being tired or sick, or under high cognitive load. As a result, an intended tapping gesture may not have the characteristic of a normal tapping input due to the user's inability to quickly lift his/her finger within a required period. For example, it may take the user 0.5 second to complete the gesture input, like that shown in the right diagram of FIG. 4A. In such cases, the processing unit 142 may increase the input-receiving time threshold (e.g., from 0.4 second to 0.6 second) to allow the user more time to complete the gesture input, such as to complete the tapping input, or a double-tapping input. Thus, in the above example, even if it takes the user 0.5 second to complete the gesture, under the second context, the processing unit 142 may still accept the gesture input (which will otherwise be rejected in the first context scenario).

It should be noted that the input-receiving time thresholds in the above examples can be different in other cases. Also, different gesture inputs may have different input-receiving time thresholds. For example, the input-receiving time thresholds (for first and second contexts, respectively) for a double-tap gesture input may be different from those for a single-tap gesture, and/or may be different from those for a swiping gesture.

In one example, the processing unit 142 is configured to utilize the first processing scheme with a first duration of the input-receiving time threshold when the user input is received by the touch-based interface 150 under a first context (e.g., condition, circumstance, situation, etc., in which the user input is received), such as when the wearable device 100 is stationary or has a motion below a first motion threshold. The processing unit 142 may also be configured to utilize the second processing scheme with a second duration of the input-receiving time threshold when the user input is received by the touch-based interface 150 under a second context, such as when the wearable device is in motion or if the motion is above the first motion threshold or a second motion threshold (another motion threshold). The second motion threshold may be higher than the first motion threshold. The motion may be indicated by motion data output by the motion sensor. Thus, the processing unit 142 may be configured to selectively utilize the first processing scheme or the second processing scheme based on output from the motion sensor (an example of the sensor 140).

As another example, the processing unit 142 may be configured to utilize the first processing scheme with a first duration of the input-receiving time threshold when the user input is received by the touch-based interface 150 under a first context when a user input error rate (number of user input errors) associated with the user input is below a first error threshold. The processing unit 142 may also be configured to utilize the second processing scheme with a second duration of the input-receiving time threshold when the user input is received by the touch-based interface 150 under a second context when the user input error rate (number of user input errors) associated with the user input is above the first error threshold or a second error threshold. The user input error rate may be indicated by data output by an input error detector. Thus, the processing unit 142 may be configured to selectively utilize the first processing scheme or the second processing scheme based on output from the input error detector (an example of the sensor 140).

As another example, the processing unit 142 may be configured to utilize the first processing scheme with a first duration of the input-receiving time threshold when the user input is received by the touch-based interface 150 under a first context when the user is in a quiet environment or in an environment having a sound level below a first sound threshold. The processing unit 142 may also be configured to utilize the second processing scheme with a second duration of the input-receiving time threshold when the user input is received by the touch-based interface 150 under a second context when the user is in a noisy environment or in an environment having a sound level above the first sound threshold or the second sound threshold. The level of sound (volume) may be indicated by microphone output of a microphone. Thus, the processing unit 142 may be configured to selectively utilize the first processing scheme or the second processing scheme based on output from the microphone (an example of the sensor 140).

As a further example, the processing unit 142 may be configured to utilize the first processing scheme with a first duration of the input-receiving time threshold when the user input is received by the touch-based interface 150 under a first context when the user is not stressed, not tired, and/or not sick. The processing unit 142 may also be configured to utilize the second processing scheme with a second duration of the input-receiving time threshold when the user input is received by the touch-based interface 150 under a second context when the user is not stressed, tired, and/or sick. The condition of the user may be indicated by output of one or more bio-sensors. Thus, the processing unit 142 may be configured to selectively utilize the first processing scheme or the second processing scheme based on output from the bio-sensor(s) (an example of the sensor 140).

FIG. 4B illustrates another example of providing different processing schemes to process user input received at the touch-based interface 150. The processing scheme for processing user input received at/by the touch-based interface 150 may include an input-receiving distance threshold. The input-receiving distance threshold is utilized by the processing unit 142 to determine whether a user input satisfies a distance requirement for a certain gesture input. As shown in the left diagram of FIG. 4B, a normal tap input may involve a user pressing at one location on the touch-based interface 150, followed by a lifting of the finger without dragging the finger across the surface of the touch-based interface 150 that is longer than an input-receiving distance threshold (e.g., 4 mm in the example). Thus, if the distance between the touch and lift locations is 2 mm, which is within the input-receiving distance threshold of 4 mm in the example, then the processing unit 142 interprets the gesture as a tap input. However, a user may sometimes have difficulty completing such gesture due to the user being in motion, being under stress, being tired or sick, or under high cognitive load. As a result, an intended tapping gesture may inadvertently have a short drag distance, such as 5 mm like that shown in the right diagram of FIG. 4B. In such cases, the processing unit 142 may increase the input-receiving distance threshold to relax the distance requirement for the user to complete the gesture input, such as to complete the tapping input. In the illustrated example, the input-receiving distance threshold is increased from 4 mm (for first context) to 6 mm (for second context). Thus, a slight drag of 5 mm, for example, may still be interpreted as a tapping input when in the second context, which may otherwise be rejected as a tapping input and/or may otherwise be interpreted as a swiping input in the first context.

In one example, the processing unit 142 is configured to utilize the first processing scheme with a first distance of the input-receiving distance threshold when the user input is received by the touch-based interface 150 under a first context (e.g., condition, circumstance, situation, etc., in which the user input is received), such as when the wearable device 100 is stationary or has a motion below a first motion threshold. The processing unit 142 may also be configured to utilize the second processing scheme with a second distance of the input-receiving distance threshold when the user input is received by the touch-based interface 150 under a second context, such as when the wearable device is in motion or if the motion is above the first motion threshold or a second motion threshold (another motion threshold). The second motion threshold may be higher than the first motion threshold. The motion may be indicated by motion data output by the motion sensor. Thus, the processing unit 142 may be configured to selectively utilize the first processing scheme or the second processing scheme based on output from the motion sensor (an example of the sensor 140).

As another example, the processing unit 142 may be configured to utilize the first processing scheme with a first distance of the input-receiving distance threshold when the user input is received by the touch-based interface 150 under a first context when a user input error rate associated with the user input is below a first error threshold. The processing unit 142 may also be configured to utilize the second processing scheme with a second distance of the input-receiving distance threshold when the user input is received by the touch-based interface 150 under a second context when the user input error rate associated with the user input is above the first error threshold or a second error threshold. The user input error rate may be indicated by data output by an input error detector. Thus, the processing unit 142 may be configured to selectively utilize the first processing scheme or the second processing scheme based on output from the input error detector (an example of the sensor 140).

As another example, the processing unit 142 may be configured to utilize the first processing scheme with a first distance of the input-receiving distance threshold when the user input is received by the touch-based interface 150 under a first context when the user is in a quite environment or in an environment having a sound level below a first sound threshold. The processing unit 142 may also be configured to utilize the second processing scheme with a second distance of the input-receiving distance threshold when the user input is received by the touch-based interface 150 under a second context when the user is in a noisy environment or in an environment having a sound level above the first sound threshold or the second sound threshold. The level of sound (volume) may be indicated by microphone output of a microphone. Thus, the processing unit 142 may be configured to selectively utilize the first processing scheme or the second processing scheme based on output from the microphone (an example of the sensor 140).

As a further example, the processing unit 142 may be configured to utilize the first processing scheme with a first distance of the input-receiving distance threshold when the user input is received by the touch-based interface 150 under a first context when the user is not stressed, not tired, and/or not sick. The processing unit 142 may also be configured to utilize the second processing scheme with a second distance of the input-receiving distance threshold when the user input is received by the touch-based interface 150 under a second context when the user is not stressed, tired, and/or sick. The condition of the user may be indicated by output of one or more bio-sensors. Thus, the processing unit 142 may be configured to selectively utilize the first processing scheme or the second processing scheme based on output from the bio-sensor(s) (an example of the sensor 140).

FIG. 5 illustrates another example of providing different processing schemes to process user input received at the touch-based interface 150. The processing scheme for processing user input received at touch-based interface 150 may involve use of the touched positions indicating the locations at which the user touches the touch-based interface 150. For example, if the touch-based interface 150 includes a button (e.g., the virtual button 300), when the user is stationary, the user may accurately tap the location of the button 502. However, as shown in FIG. 5, if the user is in motion (e.g., accelerating), the user may inadvertently tap a location that is shifted in the direction of the motion (or in an opposite direction of the shifted error). To compensate for such error, the processing unit 142 may be configured to shift a touch position of a touch input received at the touch-based interface 150 in a direction of the sensed motion to compensate for input error due to motion. In one example, the processing unit 142 is configured to utilize the first processing scheme that involves use of the touched position(s) as-is when the user input is received by the touch-based interface 150 under a first context (e.g., condition, circumstance, situation, etc., in which the user input is received), such as when the wearable device 100 is stationary or has a motion below a first motion threshold. The processing unit 142 may also be configured to utilize the second processing scheme that involves use of shifted touched position(s) when the user input is received by the touch-based interface 150 under a second context, such as when the wearable device is in motion or if the motion is above the first motion threshold or a second motion threshold (another motion threshold). The second motion threshold may be higher than the first motion threshold. The motion may be indicated by motion data output by the motion sensor. Thus, the processing unit 142 may be configured to selectively utilize the first processing scheme or the second processing scheme based on output from the motion sensor (an example of the sensor 140).

FIG. 6 illustrates examples of sensors for sensing different conditions related to different context of user input received at a touch-based interface. As shown in row 602 in the table 600 of FIG. 6, the sensor 140 may be one or more motion sensor(s), such as one or more accelerometer(s), gyroscope (s), etc., configured to sense a motion of the wearable device 100. Such motion sensor(s) may be helpful in detecting whether the user of the wearable device 100 is in motion, such as when the user is walking, running, or traveling in a moving vehicle. The processing unit 142 may utilize such information from the motion sensor(s) as context of the user input from the touch-based interface 150, and selects a processing scheme to process the user input based on the sensor output (context).

As shown in row 604 in the table 600 of FIG. 6, the sensor 140 may be an orientation sensor configured to sense an orientation of the wearable device 100. The sensed orientation may be a relative orientation of the wearable device 100 with respect to the user, with respect to a local coordinate system (e.g., that of a room), or with respect to a global coordinate system. Such sensor may be helpful in detecting whether the wearable device 100 is being worn in its intended position or not. The processing unit 142 may utilize such information from the orientation sensor as context of the user input from the touch-based interface 150, and selects a processing scheme to process the user input based on the sensor output (context).

As shown in row 606 in the table 600 of FIG. 6, the sensor 140 may be a light sensor and/or a clock configured to provide an output indicating a lighting condition in an environment of the wearable device 100. Such sensor(s) may be helpful in detecting whether the wearable device 100 is being worn when the user is in a dark environment, in a lit/bright environment, during daytime, during nighttime, etc. The processing unit 142 may utilize such information from the light sensor and/or a clock as context of the user input from the touch-based interface 150, and selects a processing scheme to process the user input based on the sensor output (context).

As shown in row 608 in the table 600 of FIG. 6, the sensor 140 may be an input-error detector configured to provide an output indicating a number of touch input errors made by the user for certain input gesture. Such sensor may be helpful in detecting whether the user is making more touch input errors than before, or more touch input errors compared to an average value or to a pre-set threshold. The processing unit 142 may utilize such information from the input-error detector as context of the user input from the touch-based interface 150, and selects a processing scheme to process the user input based on the sensor output (context).

As shown in row 610 in the table 600 of FIG. 6, the sensor 140 may be a microphone and/or one or more bio-sensor(s) configured to provide an output indicating a cognitive load of the user of the wearable device 100. Such sensor(s) may be helpful in detecting whether the user is under stress or is not feeling well, such that the user's motor skills may be affected. The processing unit 142 may utilize such information from the microphone and/or one or more bio-sensor(s) as context of the user input from the touch-based interface 150, and selects a processing scheme to process the user input based on the sensor output (context).

FIG. 7 illustrates examples of reconfiguration of input interface parameters based on different contexts of user input received at a touch-based interface. In the table 700 of FIG. 7, the left most column indicates different input interface parameters utilized by the processing unit 142 in processing schemes to process user input received at the touch-based interface 150. The input interface parameters include interface widget parameter(s) 702 (such as widget size, widget position, etc.), input-receiving time threshold 704, input-receiving distance threshold 706, and touch input position 708.

The interface widget parameter(s) 702 may be parameter (s) for implementing an interface widget (virtual object) at the touch-based interface 150, like that described with reference to FIG. 3. For example, the interface widget may be a virtual button (e.g., a volume button, an on-off button, a mute button, a mode-switch button, etc.), and the interface widget parameter(s) 702 may include an object size (e.g., button size) and/or object location (e.g., button position). As another example, the interface widget may be a virtual slider (e.g., a volume slider for controlling volume). In such cases, the interface widget parameter(s) 702 may include an object size (e.g., slider size) and/or object location (e.g., slider position). As shown in the right most column in the table 700 of FIG. 7, the processing unit 142 may reconfigure the interface widget parameter(s) 702 based on a context of the user input, e.g., by increasing a size of a button and/or changing a position of the button, such as when the input precision is low, when there is motion, when motion data satisfies a criterion, etc.). In one implementation, the processing unit 142 may select a first processing scheme that involves a first widget size (e.g., smaller button size) when sensor information indicates a first context of the user input, and may select a second processing scheme that involves a second widget size (e.g., larger button size) when sensor information indicates a second context of the user input. The first context may be the situation in which the user input precision is normal or high, such as due to the user being stationary, the user being not tired, not stressed, and/or not sick, etc. The second context may be the situation in which the user input precision is low, such as due to the user being in motion, the user being tired, stressed, or sick, or otherwise under a high cognitive load. The above reconfiguration feature is advantageous because it allows the user more time to use less accuracy to complete a gesture input when the user is having difficulty executing the gesture input.

As discussed with reference to FIG. 4A, the input-receiving time threshold 704 in FIG. 7 is utilized by the processing unit 142 to determine whether a user input satisfies a temporal requirement for a certain gesture input. The input-receiving time threshold 704 may have different values for different gesture inputs, such as tapping input, swiping input, etc. For example, the input-receiving time threshold 704 may have a value of 1 second for tapping input. In such cases, if the user press onto the touch-based interface 150 for longer than 1 second, then the processing unit 142 may determine that the input is not a tapping input. As another example, the input-receiving time threshold 704 may have a value of 2 seconds for swiping input. In such cases, if the user swipe at the touch-based interface 150 for a period that is longer than 2 seconds, then the processing unit 142 may determine that the input is not a swiping input. As shown in the right most column in the table 700 of FIG. 7, the processing unit 142 may reconfigure the interface input-receiving time threshold 704 based on a context of the user input, e.g., by increasing the input-receiving time threshold 704, when the input precision is low. In one implementation, the processing unit 142 may select a first processing scheme that involves a first duration (e.g., shorter duration, such as 1 second to accomplish a tapping input) for the input-receiving time threshold 704 when sensor information indicates a first context of the user input, and may select a second processing scheme that involves a second duration (e.g., longer duration, such as 1.5 seconds to accomplish a tapping input) for the input-receiving time threshold 704 when sensor information indicates a second context of the user input. The first context may be the situation in which the user input precision is normal or high, such as due to the user being stationary, the user being not tired, not stressed, and/or not sick, etc. The second context may be the situation in which the user input precision is low, such as due to the user being in motion, the user being tired, stressed, or sick, or otherwise under a high cognitive load. The above reconfiguration feature is advantageous because it provides the user more time to complete a gesture input when the user is having difficulty executing the gesture input.

As discussed with reference to FIG. 4B, the input-receiving distance threshold 706 of FIG. 7 is utilized by the processing unit 142 to determine whether a user input satisfies a distance requirement for a certain gesture input. The input-receiving distance threshold 706 may have different values for different gesture inputs, such as tapping input, swiping input, etc. For example, the input-receiving distance threshold 706 may have a maximum value of 2 mm for tapping input. In such cases, if the user moves the finger across the touch-based interface 150 for longer than 2 mm in distance, then the processing unit 142 may determine that the input is not a tapping input. As another example, the input-receiving distance threshold 706 may have a minimum value of 1 mm for swiping input. In such cases, if the user swipe at the touch-based interface 150 for a distance that is shorter than 1 mm, then the processing unit 142 may determine that the input is not a swiping input. Thus, the input-receiving distance threshold 706 may be a minimum threshold or a maximum threshold, depending on the gesture. As shown in the right most column in the table 700 of FIG. 7, the processing unit 142 may reconfigure the interface input-receiving distance threshold 706 based on a context of the user input, e.g., by increasing or reducing the input-receiving distance threshold 706, when the input precision is low.

In one example, the processing unit 142 may select a first processing scheme that involves a first distance (e.g., shorter distance, such as 2 mm to accomplish a tapping input) for the input-receiving distance threshold 706 when sensor information indicates a first context of the user input, and may select a second processing scheme that involves a second distance (e.g., longer distance, such as 4 mm to accomplish a tapping input) for the input-receiving distance threshold 706 when sensor information indicates a second context of the user input. The first context may be the situation in which the user input precision is normal or high, such as due to the user being stationary, the user being not tired, not stressed, and/or not sick, etc. The second context may be the situation in which the user input precision is low, such as due to the user being in motion, the user being tired, stressed, or sick, or otherwise under a high cognitive load. In some cases, a user may find a button difficult to tap while the user is in motion (e.g., running, walking, etc.). Due to the motion, the user may inadvertently drag his/her finger by mistake while trying to perform a tapping input. Without the benefit of the above reconfiguration feature, a software may erroneously interpret the input as a swiping input. Thus, the above reconfiguration feature is advantageous because it relaxes the requirement for the user to complete a tapping input when the user is having difficulty executing the tapping input (e.g., the user does not need to lift his/her finger away from the touch-based interface 150 as fast to complete a tapping input). In some cases, by relaxing the input-receiving distance threshold 706, the processing unit 142 may interpret a short drag as a tap, and may interpret two short drags, or one tap plus a short drag as a double-tap.

The touch input position 708 represent the touch point(s) detected by the touch-based interface 150, like that discussed with reference to FIG. 5. As shown in the right most column in the table 700 of FIG. 7, the processing unit 142 may reconfigure the touch input position 708 based on a context of the user input, e.g., by shifting the touch point(s) detected by the touch-based interface 150 when motion is detected. In one example, the processing unit 142 may select a first processing scheme that utilizes the touch input position(s) as-is when sensor information indicates a first context of the user input, and may select a second processing scheme that shifts the touch input position(s) by a distance in a certain direction when sensor information indicates a second context of the user input. The shifted distance may be a pre-fixed or pre-determined distance. Alternatively, the shifted distance may be based on (e.g., proportional to) a degree of the motion (e.g., acceleration, distance). The direction of the shifting may be the same the direction of the detected motion. The first context may be the situation in which the user is stationary or when a motion of the user is below a first motion threshold. The second context may be the situation in which the user is in motion, or when the motion of the user is above the first motion threshold or a second motion threshold (another motion threshold). The second motion threshold may be higher than the first motion threshold. In some cases, a user may execute a gesture input at a center of the touch-based interface 150, or a center of a widget of the touch-based interface 150, when the user is stationary. However, when the user is under motion, the user may inadvertently execute a gesture input or a part of a gesture input at a location that is away from the center of the touch-based interface 150, or away from the center of the interface widget. Thus, the above reconfiguration feature is advantageous because it compensates the inaccuracy of the touched position at the touch-based interface 150 by shifting the touched position in the direction of the motion.

The processing unit 142 described herein may include hardware, software, or a combination of both. For example, in some cases, the processing unit 142 may include one or more processors, one or more hardware components, one or more circuits, or any combination of the foregoing. In some cases, the processing unit 142 may include one or more sub-processing units configured to perform different functions. For example, the processing unit 142 may include a first sub-processing unit configured to process data provided by the touch-based interface 150 to interpret user input, and may include a second sub-processing unit configured to process sensor data from the sensor 140 to determine a context in which the user input is received by the touch-based interface 150. In some cases, the processing unit 142 may include one or more neural network models configured to perform one or more functions described herein. For example, the neural network model(s) may be configured to receive interface data generated by the touch-based interface 150 in response to user input, and to process the interface data to identify gesture inputs. Alternatively or additionally, the neural network model(s) may be configured to receive sensor signals from the sensor 140, and process the sensor signals to identify one or more contexts associated with the user input received via the touch-based interface 150. In other cases, the processing unit 142 may not include any neural network model, and the various functions described herein may be carried out without utilizing any neural network model.

As used in this specification, the term "neural network model" refers to any computing unit, system, or module made up of a number of interconnected processing elements, which process information by their dynamic state response to input. In some embodiments, the neural network model may have deep learning capability, machine learning capability, and/or artificial intelligence. In some embodiments, the neural network model may be simply any computing element that can be trained using one or more data sets. Also, in some embodiments, the neural network model may be any type of neural network. By means of non-limiting examples, the neural network model may be a perceptron, a feedforward neural network, a radial basis neural network, a deep-feed forward neural network, a recurrent neural network, a long/short term memory neural network, a gated recurrent unit, an auto encoder neural network, a variational auto encoder neural network, a denoising auto encoder neural network, a sparse auto encoder neural network, a Markov chain neural network, a Hopfield neural network, a Boltzmann machine, a restricted Boltzmann machine, a deep belief network, a convolutional network, a deconvolutional network, a deep convolutional inverse graphics network, a generative adversarial network, a liquid state machine, an extreme learning machine, an echo state network, a deep residual network, a Kohonen network, a support vector machine, a neural turing machine, a modular neural network, a sequence-to-sequence model, etc., or any combination of the foregoing.

Also, in some cases, the hearing device 100 may include a non-transitory medium storing the parameters and thresholds described herein. Such non-transitory may be considered to be a part of the processing unit 142, or a component that is separate from the processing unit 142 and that is communicatively coupled to the processing unit 142. By means of non-limiting examples, the non-transitory medium may store one, any combination, or all, of the parameters 702, 704, 706, 708, and/or may store any of the thresholds or reconfiguration parameters discussed with reference to these parameters 702, 704, 706, 708.

Figure 8:
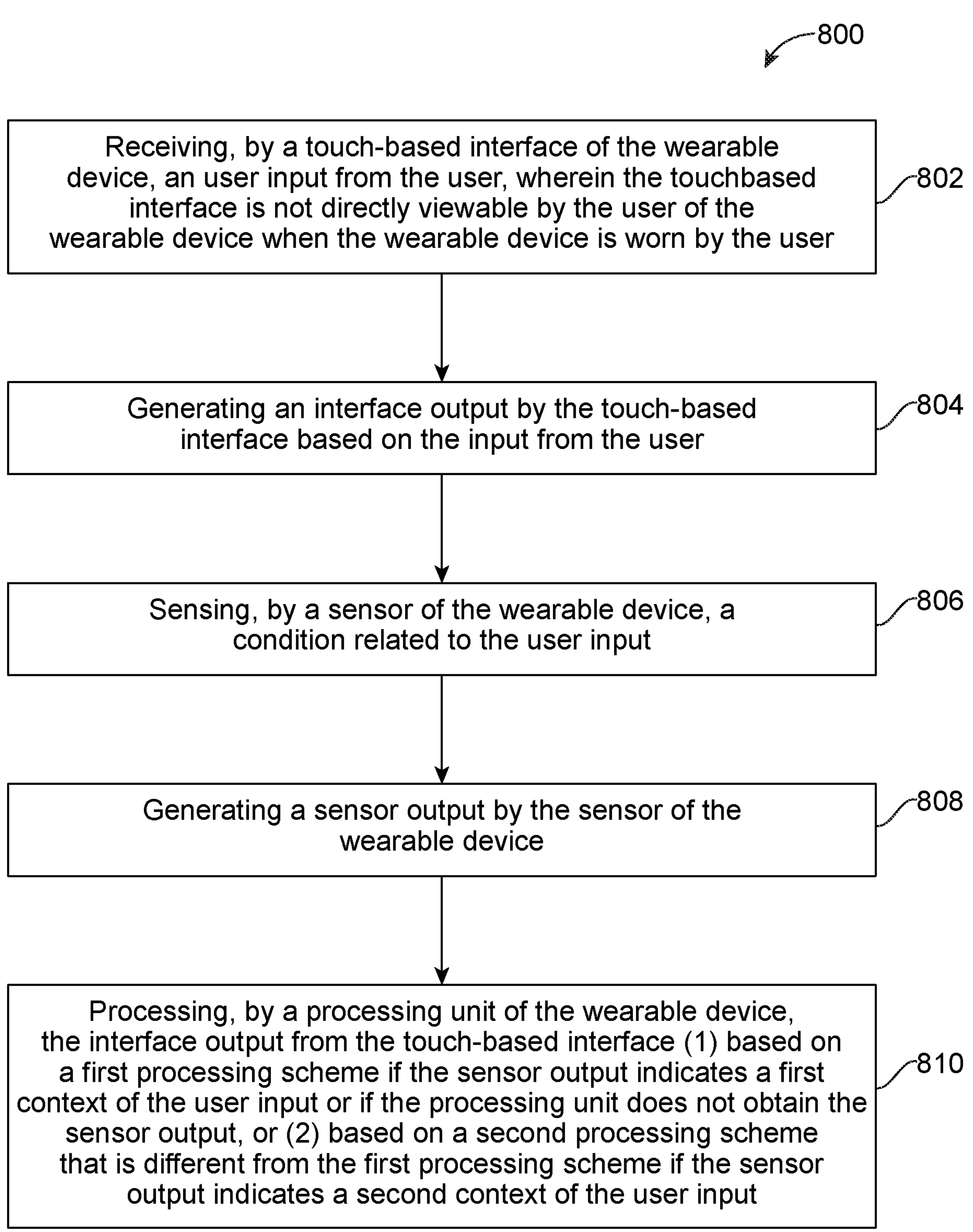
FIG. 8 illustrates a method performed by a wearable device.

FIG. 8 illustrates a method 800 in accordance with some embodiments. The method 800 may be performed by a processing unit of a wearable device 100, such as the processing unit 142 of the wearable device 100 described herein. The method 800 includes: receiving, by a touch-based interface of the wearable device, an user input from the user, wherein the touch-based interface is not directly viewable by the user of the wearable device when the wearable device is worn by the user (item 802); generating an interface output by the touch-based interface based on the input from the user (item 804); sensing, by a sensor of the wearable device, a condition related to the user input (item 806); generating a sensor output by the sensor of the wearable device (item 808); and processing, by a processing unit of the wearable device, the interface output from the touch-based interface (1) based on a first processing scheme if the sensor output indicates a first context of the user input or if the processing unit does not obtain the sensor output, or (2) based on a second processing scheme that is different from the first processing scheme if the sensor output indicates a second context of the user input (item 810).

FIGS. 9-13 illustrate exemplary form factors of the wearable device of FIG. 1.

Figures 9, 10, 11, 12, 13:
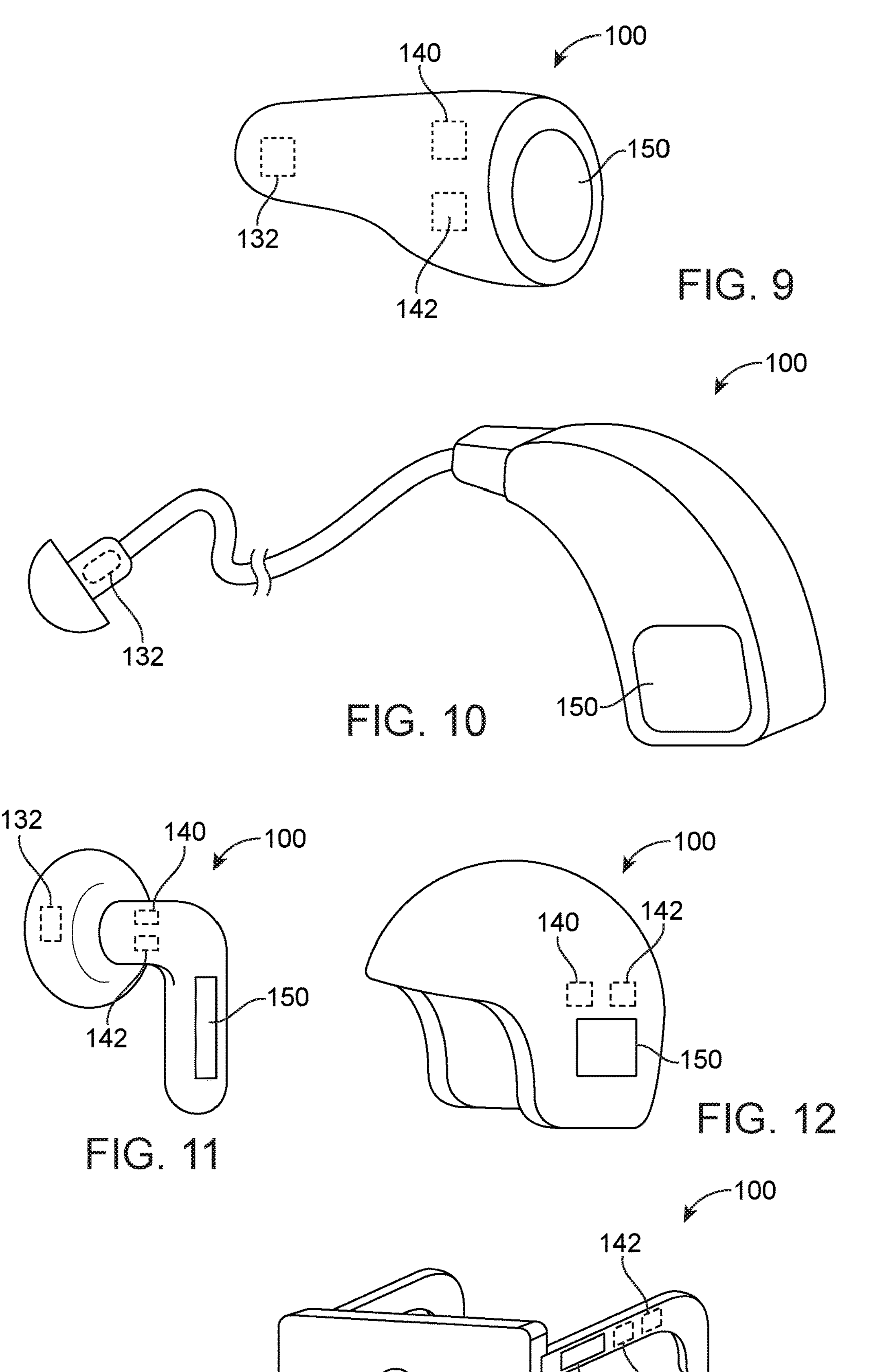
FIG. 9 illustrates a variation of the wearable device of FIG. 1, particularly showing the wearable device in a form of an earpiece.
FIG. 10 illustrates another variation of the wearable device of FIG. 1, particularly showing the wearable device having a behind-the-ear unit.
FIG. 11 illustrates another variation of the wearable device of FIG. 1, particularly showing the wearable device in a form of an earpiece having an elongated body.
FIG. 12 illustrates a wearable device in a form of a helmet.
FIG. 13 illustrates a wearable device in a form of an eyewear.

As shown in FIG. 9, the wearable device 100 may be an earpiece. The earpiece may be a hearing aid or a media earbud. The touch-based interface 150 may be implemented at an end face of the earpiece, wherein the end face is facing towards an environment of the user.

As shown in FIG. 10, the wearable device 100 may be a hearing aid with a behind-the-ear unit, and the touch-based interface 150 is at the behind-the-ear unit. The behind-the-ear unit is configured for placement behind an ear of the user. The wearable device 100 may also include an earpiece for placement in an ear canal of the user. The earpiece is coupled with the behind-the-ear unit via a cable or a sound tube.

As shown in FIG. 11, in other cases, the wearable device 100 may be an earpiece with an elongated body. The touch-based interface 150 may be implemented at the elongated boy. For example, the touch-based interface 150 may be a virtual slider and/or a virtual button at the elongated body.

As shown in FIG. 12, in other cases, the wearable device 100 may be a helmet, and the touch-based interface 150 is at the helmet. In the illustrated example, the touch-based interface 150 is at a side of the helmet covering an ear of the user. In other cases, the touch-based interface 150 may be at other locations of the helmet, such as above a part of the helmet covering the ear.

As shown in FIG. 13, in further cases, the wearable device 100 may be an eyewear, and the touch-based interface 150 may be at a side of the eyewear.

Hearing Device

As discussed, the wearable device 100 may be a hearing device. In some cases, the hearing device may be an earbud, on-the-ear headphone, over-the-ear headphone, ear protection device. In such cases, the hearing device may be a part of a headset (e.g., a headset having multiple earbuds, multiple one-the-ear headphones, multiple over-the-ear headphones, multiple hearing protection device, etc.). In other cases, the hearing device may be a headset, such as that shown in FIG. 1.

Also, in some cases, the hearing device may be a hearing aid. The hearing aid may have one of a variety of different form factors. Some of these form factors are Behind-the-Ear (BTE) hearing device, Receiver-in-Canal (RIC) hearing device, Receiver-in-Ear (RIE) hearing device or Microphone-and-Receiver-in-Ear (MaRIE) hearing device. These devices may comprise a BTE unit configured to be worn behind the ear of the user and an in the ear (ITE) unit configured to be inserted partly or fully into the user's ear canal. Generally, the BTE unit may comprise at least one input transducer, a power source and a processing unit. The term BTE hearing device refers to a hearing device where the receiver, i.e. the output transducer, is comprised in the BTE unit and sound is guided to the ITE unit via a sound tube connecting the BTE and ITE units, whereas the terms RIE, RIC and MaRIE hearing devices refer to hearing devices where the receiver may be comprised in the ITE unit, which is coupled to the BTE unit via a connector cable or wire configured for transferring electric signals between the BTE and ITE units.

In some cases, the hearing device may be an In-the-Ear (ITE) hearing device. Any of these hearing devices may comprise an ITE unit, wherein the ITE unit may comprise at least one input transducer, a power source, a processing unit and an output transducer. Also, in some cases, the hearing device may be a custom device, meaning that the ITE unit may comprise a housing having a shell made from a hard material, such as a hard polymer or metal, or a soft material such as a rubber-like polymer, molded to have an outer shape conforming to the shape of the specific user's ear canal. In other cases, the hearing device may be a non-customized device.

In an embodiment, the hearing device may comprise one or more input transducers. The one or more input transducers may comprise one or more microphones. The one or more input transducers may comprise one or more vibration sensors configured for detecting bone vibration. The one or more input transducer(s) may be configured for converting an acoustic signal into a first electric input signal. The first electric input signal may be an analogue signal. The first electric input signal may be a digital signal. The one or more input transducer(s) may be coupled to one or more analogue-to-digital converter(s) configured for converting the analogue first input signal into a digital first input signal.

In an embodiment, the hearing device may comprise one or more wireless communication unit(s). The one or more wireless communication unit(s) may comprise one or more wireless receiver(s), one or more wireless transmitter(s), one or more transmitter-receiver pair(s) and/or one or more transceiver(s). At least one of the one or more wireless communication unit(s) may be coupled to an antenna. In some cases, the wireless communication unit(s) may be implemented as a part of the processing unit 142 or another processing unit. The wireless communication unit may be configured for converting a wireless signal received by the antenna into an electric input signal. In some cases, a communication may be a processing unit implemented using hardware (e.g., a radio chip), software, or a combination of both, and the communication unit may be configured to handle processing required for sending and receiving data. The hearing device may be configured for wired/wireless audio communication, e.g. enabling the user to listen to media, such as music or radio and/or enabling the user to perform phone calls.

In some embodiments, the hearing device may include one or more microphones, and the processing unit 142 may be configured to process microphone signals from the microphone(s). The processing unit 142 may be configured to compensate for a hearing loss of the user, i.e., apply frequency dependent gain to input signals (e.g., microphone signals) in accordance with the user's frequency dependent hearing impairment. The processing unit 142 may be configured to perform feedback cancelation, beamforming, tinnitus reduction/masking, noise reduction, noise cancellation, speech recognition, bass adjustment, treble adjustment, processing of user input, or any combination of two or more of the foregoing. The processing unit 142 may be implemented using hardware, software, or a combination of both. For examples, the processing unit 142 may be a processor, an integrated circuit, an application, a functional module, etc., or any combination of the foregoing. The processing unit 142 may be implemented in a signal-processing chip or a printed circuit board (PCB). The processing unit 142 may be configured to provide an electric output signal based on a processing of microphone signal(s). The processing unit 142 may be configured to provide a second electric output signal in some cases. The second electric output signal may be based on the processing of microphone signal(s). In other cases, the hearing device may include another processing unit (e.g., an additional processing unit), and the processing of microphone signals (e.g., for hearing loss compensation) may be performed by the other processing unit.

In some embodiments, the hearing device may comprise an output transducer such as a speaker or a miniaturized speaker (e.g., the output transducer 132). The output transducer may be coupled to the processing unit (e.g., the processing unit 142 or another processing unit). The output transducer may be configured for converting electric output signal into an acoustic output signal. For example, the output transducer may be configured to covert an electric output signal (provided by the processing unit 142 or another processing unit) representing a hearing loss compensated signal, into an acoustic output signal. The output transducer may be comprised in an ITE unit or in an earpiece, e.g. Receiver-in-Ear (RIE) unit or Microphone-and-Receiver-in-Ear (MaRIE) unit, of the hearing device. One or more of the input transducer(s) may be comprised in an ITE unit or in an earpiece.

In other cases, the processing unit 142 may be dedicated for processing interface data output by the touch-based interface 150 in response to user input. In such cases, the processing unit 142 may or may not be coupled to the receiver 116.

In some embodiments, the hearing device may comprise a digital-to-analogue converter configured to convert an electric output signal (e.g., signal outputted from microphone, from a processing unit such as the processing unit 142, from a wireless communication unit, etc., or a signal derived from any of the foregoing) into an analogue signal.

In an embodiment, the hearing device may comprise a power source. The power source may comprise a battery providing a first voltage. The battery may be a rechargeable battery. The battery may be a replaceable battery. The power source may comprise a power management unit. The power management unit may be configured to convert a first voltage into a second voltage. The power source may comprise a charging coil.

In any of the examples described herein, the hearing device (or pair of hearing devices) may be custom fitted, standard fitted, non-fitted, open fitted, occlusive fitted.

Specialized Processing System

Figure 14:
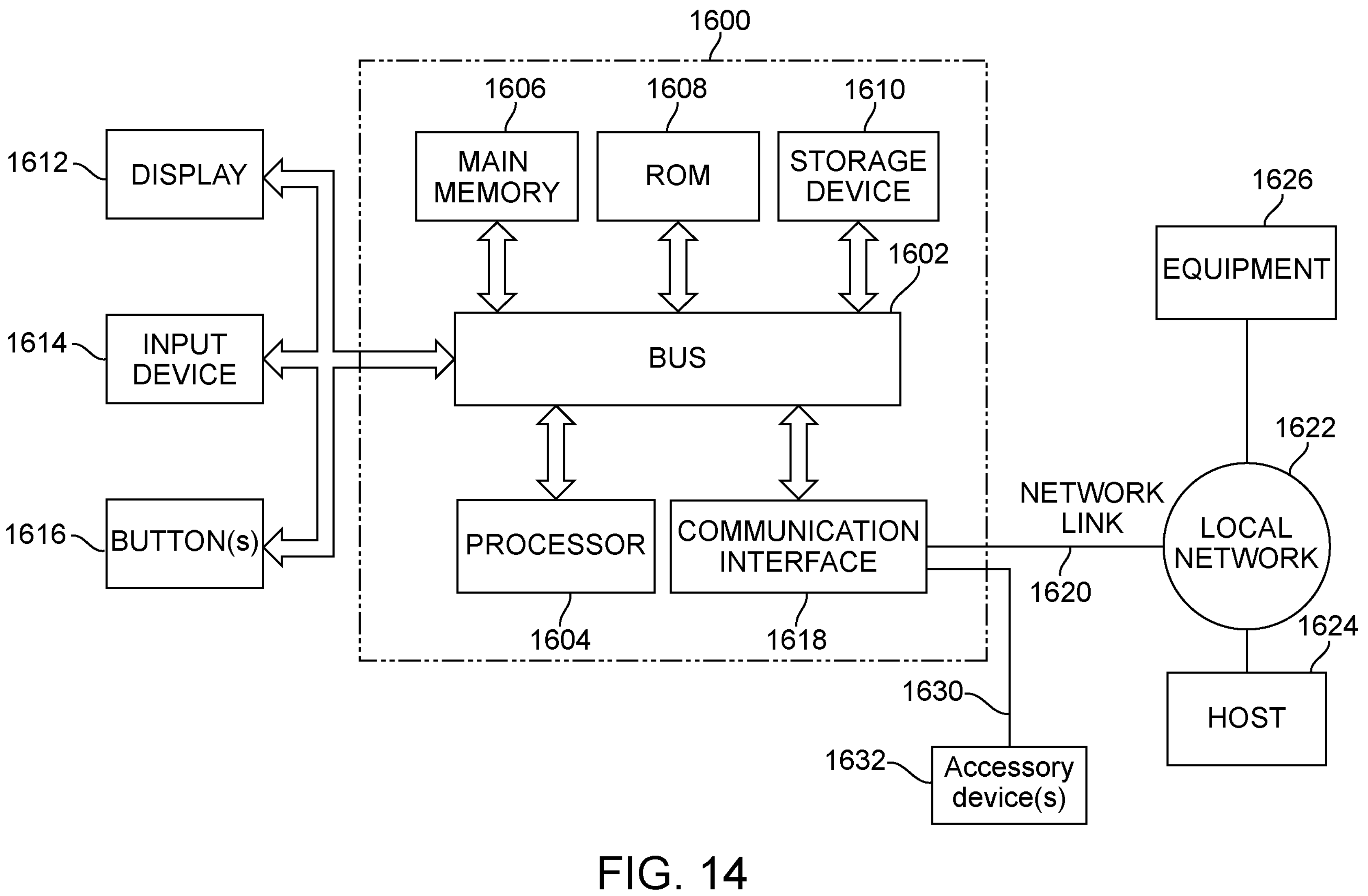
FIG. 14 illustrates examples of a specialized processing unit in a wearable device.

FIG. 14 illustrates a specialized processing system 1600 for implementing one or more components of the wearable device 100 described herein. For examples, the processing system 1600 may implement the processing unit 142 of the wearable device 100. In some cases, the processing system 1600 may include and/or may implement one or more neural network models configured to perform one or more functions described herein. For example, the neural network model(s) may be configured to receive interface data generated by the touch-based interface 150 in response to user input, and to process the interface data to identify gesture inputs. Alternatively or additionally, the neural network model(s) may be configured to receive sensor signals from the sensor 140, and process the sensor signals to identify one or more contexts associated with the user input received via the touch-based interface 150.

Processing system 1600 includes a bus 1602 or other communication mechanism for communicating information, and a processor 1604 coupled with the bus 1602 for processing information. The processing system 1600 also includes a main memory 1606, such as a random-access memory (RAM) or other dynamic storage device, coupled to the bus 1602 for storing information and instructions to be executed by the processor 1604. The main memory 1606 also may be used for storing temporary variables or other intermediate information during execution of instructions to be executed by the processor 1604. The processing system 1600 further includes a read only memory (ROM) 1608 or other static storage device coupled to the bus 1602 for storing static information and instructions for the processor 1604. A data storage device 1610 is provided and coupled to the bus 1602 for storing information and instructions.

The processing system 1600 may be coupled via the bus 1602 to a display 1612, such as a screen, for displaying information to a user. For example, the display 1612 may display battery status, network connection status, mode status, etc., or any combination of the foregoing. In some cases, in which the wearable device 100 is configured for wear at a head (e.g., around the top of the head, behind an ear, at an ear, etc.) of a user, the display 1612 may not be directly viewable when the wearable device 100 is worn by the user. However, the user can view the display 1612 when the wearable device 100 is removed from the head of the user. In other cases, the display 1612 is optional, and the wearable device 100 may not include the display 1612.

An input device 1614, such as the touch-based interface 150 described, and/or any of other data capture devices (sensors, such as any of the sensors described herein), may be coupled to the bus 1602 for communicating information and command selections to processor 1604. One or more buttons 1616, such as volume control button(s), on-off button, mode-setting button, etc., may be coupled to the bus 1602.

In some embodiments, the processing system 1600 can be used to perform various functions described herein. According to some embodiments, such use is provided by processing system 1600 in response to processor 1604 executing one or more sequences of one or more instructions contained in the main memory 1606. Those skilled in the art will know how to prepare such instructions based on the functions and methods described herein. Such instructions may be read into the main memory 1606 from another processor-readable medium, such as storage device 1610. Execution of the sequences of instructions contained in the main memory 1606 causes the processor 1604 to perform the process steps described herein. One or more processors in a multi-processing arrangement may also be employed to execute the sequences of instructions contained in the main memory 1606. In alternative embodiments, hard-wired circuitry may be used in place of or in combination with software instructions to implement the various embodiments described herein. Thus, embodiments are not limited to any specific combination of hardware circuitry and software.

The term "processor-readable medium" as used herein refers to any medium that participates in providing instructions to the processor 1604 for execution. Such a medium may take many forms, including but not limited to, non-volatile media, volatile media, and transmission media. Non-volatile media may include one or more storage devices, such as the storage device 1610. A non-volatile medium may be considered an example of non-transitory medium. Volatile media includes dynamic memory, such as the main memory 1606. A volatile medium may be considered an example of non-transitory medium. Transmission media includes cables, wire and fiber optics, including the wires that comprise the bus 1602. Transmission media can also take the form of acoustic or light waves, such as those generated during radio wave and infrared data communications.

Common forms of processor-readable media include, for example, hard disk, a magnetic medium, a CD-ROM, any other optical medium, a RAM, a PROM, and EPROM, a FLASH-EPROM, any other memory chip or cartridge, a carrier wave as described hereinafter, or any other medium from which a processor can read.

Various forms of processor-readable media may be involved in carrying one or more sequences of one or more instructions to the processor 1604 for execution. For example, the instructions may initially be carried on a storage of a remote computer (e.g., server) or remote device. The remote computer or device can send the instructions over a network, such as the Internet. A receiving unit local to the processing system 1600 can receive the data from the network, and provide the data on the bus 1602. The bus 1602 carries the data to the main memory 1606, from which the processor 1604 retrieves and executes the instructions. The instructions received by the main memory 1606 may optionally be stored on the storage device 1610 either before or after execution by the processor 1604.

The processing system 1600 also includes a communication interface 1618 coupled to the bus 1602. The communication interface 1618 provides a two-way data communication coupling to a network link 1620 that is connected to a local network 1622. For example, the communication interface 1618 may be an integrated services digital network (ISDN) card to provide a data communication. As another example, the communication interface 1618 may be a local area network (LAN) card to provide a data communication connection to a compatible LAN. Wireless links may also be implemented. In any such implementation, the communication interface 1618 sends and receives electrical, electromagnetic or optical signals that carry data streams representing various types of information.

The network link 1620 may provide data communication through one or more networks to other devices. For example, the network link 1620 may provide a connection through local network 1622 to a host computer 1624 (e.g., a server, a computer of the user, a computer of another person, etc.) or to equipment 1626. The data streams transported over the network link 1620 can comprise electrical, electromagnetic or optical signals. The signals through the various networks and the signals on the network link 1620 and through the communication interface 1618, which carry data to and from the processing system 1600, are exemplary forms of carrier waves transporting the information. The processing system 1600 can send messages and receive data, including program code, through the network(s), the network link 1620, and the communication interface 1618.

The communication interface 1618 may also provide a communication connection, such as a network link, 1630 with an accessory device 1632. By means of non-limiting examples, the accessory device 1632 may be a mobile phone (cell phone) of the user of the wearable device 100, a tablet, a computer, a remote control, a media device, etc. In some cases, the communication interface 1618 may include a first interface unit configured to provide communication via the network link 1620 at a first frequency range, and a second interface unit configured to provide communication via the network link 1630 at a second frequency range that is different from the first frequency range.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

Some of the above-described features are summarized as the below items:

Item 1. A wearable device comprising:

a first output transducer configured to provide an audio output for perception by a user of the wearable device;

a touch-based interface configured to receive an user input from the user, and to generate an interface output based on the input from the user, wherein the touch-based interface is not directly viewable by the user of the wearable device when the wearable device is worn by the user;

a sensor configured to sense a condition related to the user input, and to generate a sensor output; and a processing unit configured to process the interface output from the touch-based interface based on a first processing scheme if the sensor output indicates a first context of the user input or if the processing unit does not obtain the sensor output, and wherein the processing unit is configured to process the interface output based on a second processing scheme that is different from the first processing scheme if the sensor output indicates a second context of the user input.

Item 2. The wearable device of Item 1, wherein the sensor output indicates the first context when the wearable device is stationary or has a motion that is below a motion threshold.

Item 3. The wearable device of Item 1, wherein the sensor output indicates the second context when the wearable device is in motion or has a motion that is above a motion threshold.

Item 4. The wearable device of Item 1, wherein the sensor output indicates the first context when a user input error rate is below an error threshold.

Item 5. The wearable device of Item 1, wherein the sensor output indicates the second context when a user input error rate is above an error threshold.

Item 6. The wearable device of Item 1, wherein the sensor output indicates the first context when the user is under a cognitive load that is below a cognitive load threshold.

Item 7. The wearable device of Item 1, wherein the sensor output indicates the second context when the user is under a cognitive load that is higher than a cognitive load threshold.

Item 8. The wearable device of Item 1, wherein the touch-based interface includes a virtual button, wherein the virtual button has a first size in the first processing scheme, and has a second size in the second processing scheme, the second size being larger than the first size.

Item 9. The wearable device of Item 1, wherein the first and second processing schemes involve an input-receiving time threshold, wherein the input-receiving time threshold has a first duration in the first processing scheme, and has a second duration in the second processing scheme, the second duration being longer than the first duration to allow the user more time to make an input gesture.

Item 10. The wearable device of Item 1, wherein the first and second processing schemes involve an input-receiving distance threshold, wherein the input-receiving distance threshold has a first distance in the first processing scheme, and has a second distance in the second processing scheme, the second distance being shorter than the first distance.

Item 11. The wearable device of Item 10, wherein the input-receiving distance threshold is for allowing the processing unit to identify a tap input.

Item 12. The wearable device of Item 10, wherein the input-receiving distance threshold is for allowing the processing unit to identify a swipe input.

Item 13. The wearable device of Item 1, wherein the sensor is configured to sense motion, and wherein the processing unit is configured to shift a touch position at the touch-based interface in a direction of the sensed motion to compensate for input error due to the sensed motion.

Item 14. The wearable device of Item 1, wherein the sensor comprises a motion sensor;

wherein the processing unit is configured to utilize the first processing scheme if the sensor output indicates that the wearable device is stationary or has a motion that is below a motion threshold; and wherein the processing unit is configured to utilize the second processing scheme if the sensor output indicates that the wearable device is in motion or has a motion that is higher than the motion threshold or another motion threshold.

Item 15. The wearable device of Item 1, wherein the sensor comprises in input-error detector;

wherein the processing unit is configured to utilize the first processing scheme if the sensor output indicates a number of input-errors that is below an error threshold; and wherein the processing unit is configured to utilize the second processing scheme if the sensor output indicates that the number of input-errors is higher than the error threshold or another error threshold.

Item 16. The wearable device of Item 1, wherein the sensor comprises a microphone configured to detect sound from an environment;

wherein the processing unit is configured to utilize the first processing scheme if the sensor output indicates that the user is in a quiet environment or that the sound from the environment is below a sound threshold; and wherein the processing unit is configured to utilize the second processing scheme if the sensor output indicates that the user is in a noisy environment or that the sound from the environment is above the sound threshold or another sound threshold.

Item 17. The wearable device of Item 1, wherein the sensor comprises a biosensor configured to sense one or more bio-parameters of the user.

Item 18. The wearable device of Item 17, wherein the processing unit is configured to utilize the first processing scheme if the sensor output indicates that the user is not stressed or not tired; and wherein the processing unit is configured to utilize the second processing scheme if the sensor output indicates that the user is stressed or tired.

Item 19. The wearable device of Item 17, wherein the processing unit is configured to utilize the first processing scheme if the sensor output indicates that the user is not sick; and wherein the processing unit is configured to utilize the second processing scheme if the sensor output indicates that the user is sick.

Item 20. The wearable device of Item 1, wherein the wearable device is a hearing aid.

Item 21. The wearable device of Item 20, wherein the hearing aid comprises a behind-the-ear unit, and the touch-based interface is at the behind-the-ear unit.

Item 22. The wearable device of Item 1, wherein the wearable device is a headset.

Item 23. The wearable device of Item 22, wherein the touch-based interface is at a headband of the headset.

Item 24. The wearable device of Item 22, wherein the touch-based interface is at an earphone of the headset.

Item 25. The wearable device of Item 1, wherein the wearable device is a helmet, and wherein the touch-based interface is at the helmet.

Item 26. The wearable device of Item 1, wherein the wearable device is an eyewear, and wherein the touch-based interface is at a side of the eyewear.

Item 27. A method performed by a wearable device, comprising:

receiving, by a touch-based interface of the wearable device, an user input from the user, wherein the touch-based interface is not directly viewable by the user of the wearable device when the wearable device is worn by the user;

generating an interface output by the touch-based interface based on the input from the user;

sensing, by a sensor of the wearable device, a condition related to the user input; and generating a sensor output by the sensor of the wearable device;

processing, by a processing unit of the wearable device, the interface output from the touch-based interface (1) based on a first processing scheme if the sensor output indicates a first context of the user input or if the processing unit does not obtain the sensor output, or (2) based on a second processing scheme that is different from the first processing scheme if the sensor output indicates a second context of the user input.

LIST OF REFERENCES

Reference Numbers

100 wearable device
110 headband
122 first headphone
124 second headphone
132 first output transducer
134 second output transducer
140 sensor
142 processing unit
150 touch-based interface
300 virtual button
600 table
602 row
604 row
606 row
608 row
610 row
700 table
702 interface widget parameter(s)
704 input-receiving time threshold
706 input-receiving distance threshold
708 touch input position
800 method
802 item
804 item
806 item
808 item
810 item
1600 processing system
1602 BUS
1604 processor
1606 main memory
1608 ROM
1610 storage device
1612 display
1614 input device
1616 button(s)
1618 communication interface
1620 network link
1622 local network
1624 host computer
1626 equipment
1630 network link
1632 accessory device

The invention claimed is:

1. A wearable device comprising:

a first output transducer configured to provide an audio output for perception by a user of the wearable device;

a touch-based interface configured to receive an user input from the user, and to generate an interface output based on the input from the user, wherein the touch-based interface is not directly viewable by the user of the wearable device when the wearable device is worn by the user;

a sensor configured to sense a condition related to the user input, and to generate a sensor output; and a processing unit configured to process the interface output from the touch-based interface based on a first processing scheme if the sensor output indicates a first context of the user input or if the processing unit does not obtain the sensor output, and wherein the processing unit is configured to process the interface output based on a second processing scheme that is different from the first processing scheme if the sensor output indicates a second context of the user input;

wherein the touch-based interface includes a virtual button, wherein the virtual button has a first size in the first processing scheme, and has a second size in the second processing scheme, the second size being larger than the first size, wherein when the virtual button has the first size, the virtual button is not viewable by the user, and wherein when the virtual button has the second size, the virtual button is not viewable by the user.

2. The wearable device of claim 1, wherein the sensor output indicates the first context when the wearable device is stationary or has a motion that is below a motion threshold.

3. The wearable device of claim 1, wherein the sensor output indicates the second context when the wearable device is in motion or has a motion that is above a motion threshold.

4. The wearable device of claim 1, wherein the sensor output indicates the first context when a user input error rate is below an error threshold.

5. The wearable device of claim 1, wherein the sensor output indicates the second context when a user input error rate is above an error threshold.

6. The wearable device of claim 1, wherein the sensor output indicates the first context when the user is under a cognitive load that is below a cognitive load threshold stored in the wearable device.

7. The wearable device of claim 1, wherein the sensor output indicates the second context when the user is under a cognitive load that is higher than a cognitive load threshold stored in the wearable device.

8. The wearable device of claim 1, wherein the sensor is configured to sense motion, and wherein the processing unit is configured to shift a touch position at the touch-based interface in a direction of the sensed motion to compensate for input error due to the sensed motion.

9. The wearable device of claim 1, wherein the sensor comprises a motion sensor;

wherein the processing unit is configured to utilize the first processing scheme if the sensor output indicates that the wearable device is stationary or has a motion that is below a motion threshold; and wherein the processing unit is configured to utilize the second processing scheme if the sensor output indicates that the wearable device is in motion or has a motion that is higher than the motion threshold or another motion threshold.

10. The wearable device of claim 1, wherein the sensor comprises an input-error detector;

wherein the processing unit is configured to utilize the first processing scheme if the sensor output indicates a number of input-errors that is below an error threshold; and wherein the processing unit is configured to utilize the second processing scheme if the sensor output indicates that the number of input-errors is higher than the error threshold or another error threshold.

11. The wearable device of claim 1, wherein the sensor comprises a biosensor configured to sense one or more bio-parameters of the user.

12. The wearable device of claim 11, wherein the processing unit is configured to utilize the first processing scheme if the sensor output indicates that the user is not stressed or not tired; and wherein the processing unit is configured to utilize the second processing scheme if the sensor output indicates that the user is stressed or tired.

13. The wearable device of claim 11, wherein the processing unit is configured to utilize the first processing scheme if the sensor output indicates that the user is not sick; and wherein the processing unit is configured to utilize the second processing scheme if the sensor output indicates that the user is sick.

14. The wearable device of claim 1, wherein the wearable device is a hearing aid.

15. The wearable device of claim 14, wherein the hearing aid comprises a behind-the-ear unit, and the touch-based interface is at the behind-the-ear unit.

16. The wearable device of claim 1, wherein the wearable device is a headset.

17. The wearable device of claim 16, wherein the touch-based interface is at a headband of the headset.

18. The wearable device of claim 16, wherein the touch-based interface is at an earphone of the headset.

19. The wearable device of claim 1, wherein the wearable device is a helmet, and wherein the touch-based interface is at the helmet.

20. The wearable device of claim 1, wherein the wearable device is an eyewear, and wherein the touch-based interface is at a side of the eyewear.

21. A wearable device comprising:

a first output transducer configured to provide an audio output for perception by a user of the wearable device;

a touch-based interface configured to receive an user input from the user, and to generate an interface output based on the input from the user, wherein the touch-based interface is not directly viewable by the user of the wearable device when the wearable device is worn by the user;

a sensor configured to sense a condition related to the user input, and to generate a sensor output; and a processing unit configured to process the interface output from the touch-based interface based on a first processing scheme if the sensor output indicates a first context of the user input or if the processing unit does not obtain the sensor output, and wherein the processing unit is configured to process the interface output based on a second processing scheme that is different from the first processing scheme if the sensor output indicates a second context of the user input;

wherein the first and second processing schemes involve an input-receiving time threshold, wherein the input-receiving time threshold has a first duration in the first processing scheme, and has a second duration in the second processing scheme, the second duration being longer than the first duration to allow the user more time to make an input gesture.

22. A wearable device comprising:

a first output transducer configured to provide an audio output for perception by a user of the wearable device;

a touch-based interface configured to receive an user input from the user, and to generate an interface output based on the input from the user, wherein the touch-based interface is not directly viewable by the user of the wearable device when the wearable device is worn by the user;

a sensor configured to sense a condition related to the user input, and to generate a sensor output; and a processing unit configured to process the interface output from the touch-based interface based on a first processing scheme if the sensor output indicates a first context of the user input or if the processing unit does not obtain the sensor output, and wherein the processing unit is configured to process the interface output based on a second processing scheme that is different from the first processing scheme if the sensor output indicates a second context of the user input;

wherein the sensor comprises a microphone configured to detect sound from an environment;

wherein the processing unit is configured to utilize the first processing scheme if the sensor output indicates that the user is in a quiet environment or that the sound from the environment is below a sound threshold; and wherein the processing unit is configured to utilize the second processing scheme if the sensor output indicates that the user is in a noisy environment or that the sound from the environment is above the sound threshold or another sound threshold.

23. The wearable device of claim 22, wherein the first and second processing schemes involve an input-receiving distance threshold, wherein the input-receiving distance threshold has a first distance in the first processing scheme, and has a second distance in the second processing scheme, the second distance being shorter than the first distance.

24. The wearable device of claim 23, wherein the input-receiving distance threshold is for allowing the processing unit to identify a tap input.

25. The wearable device of claim 23, wherein the input-receiving distance threshold is for allowing the processing unit to identify a swipe input.

26. A method performed by a wearable device, comprising:

receiving, by a touch-based interface of the wearable device, an user input from the user, wherein the touch-based interface is not directly viewable by the user of the wearable device when the wearable device is worn by the user;

generating an interface output by the touch-based interface based on the input from the user;

sensing, by a sensor of the wearable device, a condition related to the user input; and generating a sensor output by the sensor of the wearable device;

processing, by a processing unit of the wearable device, the interface output from the touch-based interface (1) based on a first processing scheme if the sensor output indicates a first context of the user input or if the processing unit does not obtain the sensor output, or (2) based on a second processing scheme that is different from the first processing scheme if the sensor output indicates a second context of the user input;

wherein the touch-based interface includes a virtual button, wherein the virtual button has a first size in the first processing scheme, and has a second size in the second processing scheme, the second size being larger than the first size, wherein when the virtual button has the first size, the virtual button is not viewable by the user, and wherein when the virtual button has the second size, the virtual button is not viewable by the user.

* * * * *